United States Patent [19]

Hähnke et al.

[11] Patent Number: 5,352,246
[45] Date of Patent: Oct. 4, 1994

[54] DYE COMPOSITION CONTAINING A MIXTURE OF WATER-SOLUBLE FIBER-REACTIVE DYES AND METHOD OF DYEING WITH SAID DYE COMPOSITION

[75] Inventors: Manfred Hähnke, Kelkheim; Marcos Segal, Suzano; Werner H. Russ, Flörsheim am Main; Uwe Mrotzeck, Kelkheim; Jutta Reiter, Frankfurt am Main; Christine Feuchtner, Glan-Münchweiler, all of Fed. Rep. of Germany

[73] Assignee: Hoechst Aktiengesellschaft, Frankfurt am Main, Fed. Rep. of Germany

[21] Appl. No.: 944,050

[22] Filed: Sep. 10, 1992

[30] Foreign Application Priority Data

Sep. 13, 1991 [DE] Fed. Rep. of Germany ....... 4130498

[51] Int. Cl.$^5$ .................... D06P 1/38; C09B 62/002; C09B 62/006
[52] U.S. Cl. ............................. 8/638; 8/549; 8/641; 8/687; 8/689; 8/692; 8/918; 544/76
[58] Field of Search ................ 8/549, 641, 687, 688, 8/689, 690, 692, 918, 638; 544/75, 76

[56] References Cited

U.S. PATENT DOCUMENTS

| | | | |
|---|---|---|---|
| 2,657,205 | 10/1953 | Heyna et al. | 260/185 |
| 3,669,951 | 6/1972 | Bien et al. | 260/146 D |
| 3,822,263 | 7/1974 | Bien et al. | 260/256.5 R |
| 3,910,758 | 10/1975 | Bien et al. | 8/41 R |
| 4,007,164 | 2/1977 | Bien et al. | 260/146 D |
| 4,052,386 | 10/1977 | Bien et al. | 260/242.2 |
| 4,314,818 | 2/1982 | Courtin | 8/549 |
| 4,412,948 | 11/1983 | Omura et al. | 260/153 |
| 4,492,654 | 1/1985 | Hoyer et al. | 534/827 |
| 4,500,321 | 2/1985 | Hugelshofer et al. | 8/527 |
| 4,629,788 | 12/1986 | Jäger | 544/76 |
| 4,705,524 | 11/1987 | Hähnke et al. | 8/527 |
| 4,774,333 | 9/1988 | Springer et al. | 544/77 |
| 4,818,814 | 4/1989 | Schläfer | 534/642 |
| 4,885,385 | 12/1989 | Springer et al. | 562/430 |
| 4,946,947 | 8/1990 | Springer et al. | 534/635 |
| 5,043,435 | 8/1991 | Springer et al. | 534/560 |
| 5,274,083 | 12/1993 | Herd et al. | 534/618 |

Primary Examiner—Paul Lieberman
Assistant Examiner—Caroline L. Dusheck

[57] ABSTRACT

The invention relates to dye compositions for obtaining level dyeings on carboxamido-containing and hydroxyl-containing fiber materials, which dyeings have comparably good light and wetlightfastness properties, the dye compositions containing dioxazine dyes (I) and disazo dyes (II) (one or more than one from IIa to IIf) in a weight ratio of 90:10 to 10:90, preferably 60:40 to 10:90, in particular 40:60 to 15:85.

18 Claims, No Drawings

DYE COMPOSITION CONTAINING A MIXTURE OF WATER-SOLUBLE FIBER-REACTIVE DYES AND METHOD OF DYEING WITH SAID DYE COMPOSITION

The invention is in the technical field of fiber-reactive dyes.

U.S. Pat. No. 4,629,788, U.S. Pat. No. 4,774,333 and U.S. Pat. No. 4,705,524 disclose water-soluble dioxazine dyes which have a $\beta$-sulfatoethylsulfonyl or vinylsulfonyl reactive group. These dyes are distinguished, in particular under the alkaline conditions necessary for the fixation of fiber-reactive dyes, by high affinity for and reactivity toward the cellulose fiber, which is the reason why in dyeing by the exhaust method exhaustion of the dyes onto the fiber and in particular their fixation on the fiber take place at such a high rate that the resulting dyeings are often considered unlevel.

A further disadvantage of the dyes of the abovementioned patent publications is that the result of dyeing by the exhaust method depends to a relatively large degree on the dyeing time. Thus, the color yield on the fiber goes through an optimum and decreases again as the dyeing time increases. In practice, longer dyeing times play a crucial role especially if the shade, after the prescribed dyeing time, does not exactly match the pattern and topping has to be carried out using one or more suitable dyes. Here, dyes which have already been applied and whose color strength and shade do not change significantly with a longer dyeing time substantially increase the safety margin of the topping operation.

Furthermore, fiber-reactive navy disazo dyes whose dyeings on cellulose fiber materials have only moderate to poor light and wetlightfastness properties are disclosed, for example, in Example 11 of GB-A1-2,029,850, Example 1 of U.S. Pat. No. 4,314,818, Example 1 of U.S. Pat. No. 4,412,948, Example 1 of U.S. Pat. No. 4,946,947 and in the Colour Index as C.I. Reactive Black 5.

The object of the present invention is to provide reactive dyes of navy hue which have improved properties in practical application with respect to light and wet light fastness for the dyeing or printing of carboxamido- or hydroxyl-containing fiber materials.

It has now been found that the disadvantages mentioned of these dyes can surprisingly be eliminated by a mixture of fiber-reactive dyes comprising at least one dye of the general formula (I) and at least one dye of the general formulae (IIa to IIf) below. Furthermore, it has been found that dye mixtures of this type or the simultaneous use of dyes of the formulae (I) and (IIa to IIf) in dyeing by the exhaust method on carboxamido-containing and in particular on cellulosic fiber materials surprisingly produce a dyeing result which does not change significantly even with a significantly longer dyeing time. Furthermore, it has been found that dye mixtures of this type or the simultaneous use of dyes of the formulae (I) and (II) surprisingly produce very level dyeings having relatively good light and wet light fastness properties. In particular, it has been found that fiber-reactive dioxazine dyes having the constitution given below of the general formula (I) no longer show coloristic disadvantages when used in a mixture with at least one navy dye of the formulae (IIa), (IIb), (IIc), (IId), (IIe) and (IIf) given below or when mixtures of these dyes (II) are used.

The present invention relates to a composition of water-soluble fiber-reactive dyes containing at least one dioxazine dye of the formula (I) and at least one disazo dye of the formulae (IIa), (IIb), (IIc), (IId), (IIe) and (IIf) in a ratio of 90:10 to 10:90 parts by weight of the dyes (I) and (II) or substantially composed thereof,

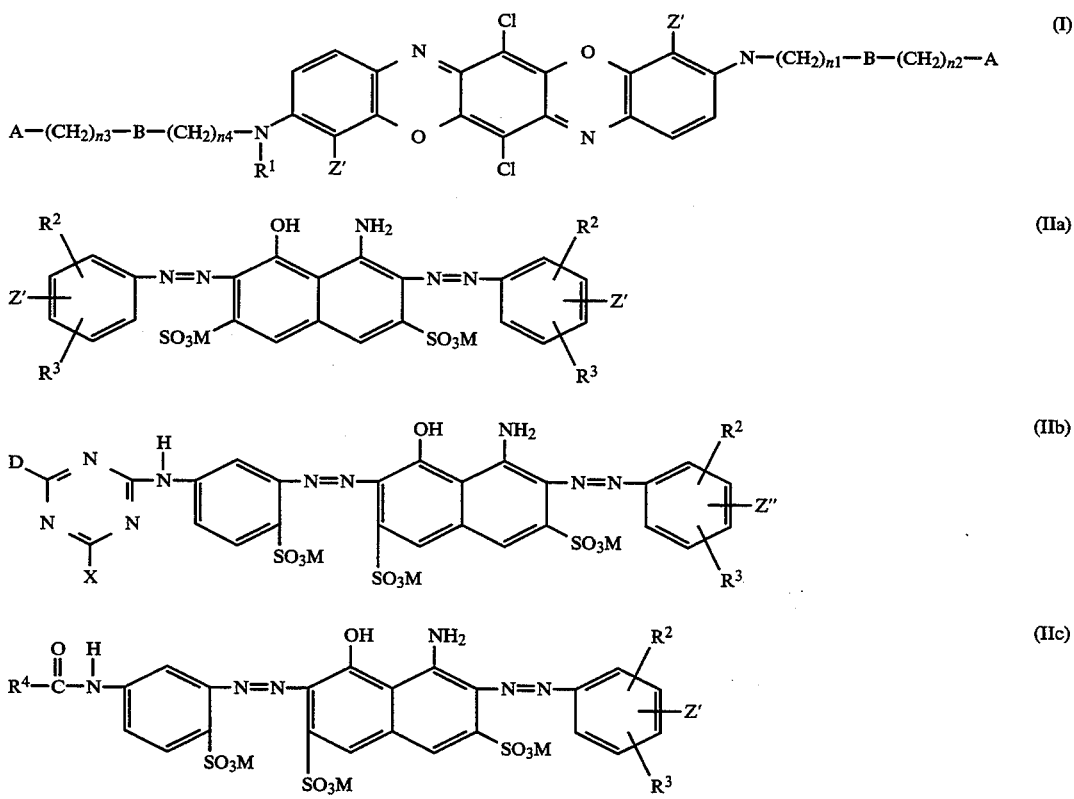

-continued

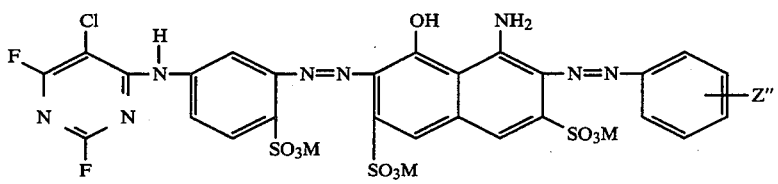

(IId)

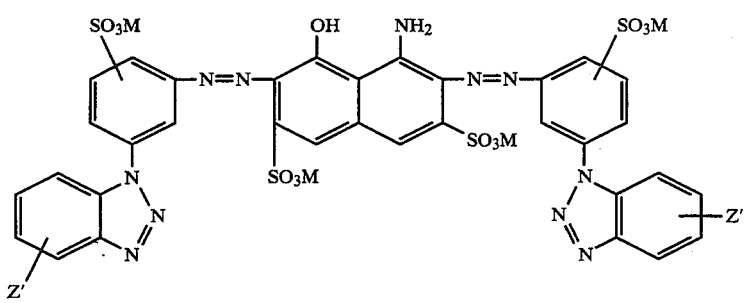

(IIe)

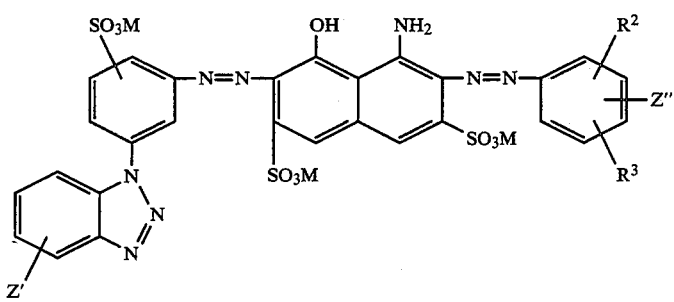

(IIf)

in which the individual symbols have meanings which are identical to or different from one another and Z' is a vinylsulfonyl group, a β-sulfatoethylsulfonyl group or an ethylsulfonyl group which is substituted in the β position by a substituent which can be eliminated by alkali with the formation of a vinylsulfonyl group;

Z" has the same meaning as Z' or is a carboxyl, sulfo or sulfonamide group of the formula (III)

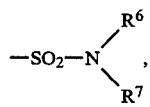 (III)

in which $R^6$ is a hydrogen atom, a $C_1$-$C_4$-alkyl group or a $C_1$-$C_4$-alkyl group which is substituted by a sulfo, sulfato, phosphato or carboxyl group, and $R^7$ is a hydrogen atom or a $C_1$-$C_4$-alkyl group which can be substituted by 1 or 2 substituents from the group comprising sulfato, sulfo, carboxyl and phosphato, or is an aryl group, preferably a phenyl group or naphthyl group which can be substituted by 1 to 3 substituents from the group comprising sulfo and carboxyl, or is a $C_1$-$C_4$-alkyl group which is substituted by an aryl group and can be substituted in the aryl moiety by 1 to 3 substituents from the group comprising sulfo and carboxyl;

$R^1$ is a hydrogen atom, a $C_1$-$C_4$-alkyl group or a $C_1$-$C_4$-alkyl group which is substituted by a sulfo, sulfato, phosphato or carboxyl group;

$R^2$ and $R^3$, independently of one another, are each a hydrogen atom, a sulfo group, a carboxyl group, a $C^1$-$C_4$-alkyl group, preferably a methyl group, an alkoxy group having 1 to 4 carbon atoms, preferably a methoxy group, or a halogen atom, preferably chlorine or bromine;

$R^4$ is a group of the formula (IV)

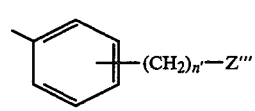 (IV)

in which

Z''' has the same meaning as Z' and is preferably a β-chloroethylsulfonyl group, and n' is an integer from 0 to 3, or is a group of the formula (V)

$-(CH_2)_{n'}-Z'$ (V)

in which

Z' has the abovementioned meaning and n' is an integer from 1 to 3;

M is a hydrogen atom or an alkali metal atom, preferably sodium, potassium or lithium;

$n_1$, $n_2$, $n_3$ and $n_4$ are each, independently of one another, an integer from 1 to 3;

A is a sulfo, sulfato, phosphato or carboxyl group;

B is a bridging member from the group comprising —O—, —S—, —SO$_2$—, —C(=O)—, —NH—, —NH—C(=O)— or —C(=O)—NH—;

D is a hydroxyl, sulfo, cyanamide or an alkoxy group having 1 to 4 carbon atoms, preferably a methoxy group, or is a halogen atom, in particular fluorine or chlorine, or a group of the formula (VI)

$-NR^6R^7$ (VI)

in which $R^6$ and $R^7$ have the abovementioned meanings, or is a group of the formula (VII)

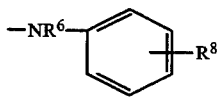
(VII)

in which
$R^6$ has the abovementioned meanings
$R^8$ is a halogen atom, preferably chlorine, or a sulfo group or a sulfonamide group of the formula (III) defined above or a carboxyl group, a β-sulfatoethylsulfonyl group, a vinylsulfonyl group or an ethylsulfonyl group which is substituted in the β position by a substituent which can be eliminated by alkali with the formation of a vinylsulfonyl group, and
X is a halogen atom, preferably chlorine or fluorine.

Examples of ethylsulfonyl groups which are substituted in the β position by substituents which can be eliminated by alkali with the formation of a vinylsulfonyl group are the β-chloroethylsulfonyl, β-sulfatoethylsulfonyl, β-phosphatoethylsulfonyl and the β-thiosulfatoethylsulfonyl groups.

Identical symbols occurring twice or several times in the individual formulae can have the same meaning each time or meanings which are different from one another; identical symbols occurring twice each time in the formula (I) preferably have the same meaning each time. Incidentally, different symbols can have meanings which within the meanings given are identical to or different from one another.

Hereinabove and hereinbelow, carboxyl groups are groups of the formula -COOM where M has the abovementioned meanings; likewise, sulfo groups are groups of the formula $-SO_3M$, phosphato groups are groups of the formula $-PO_3M_2$ and sulfato groups are groups of the formula $-OSO_3M$ where M has in each case the abovementioned meanings.

The dye or dyes of the formula (I) and the dye or dyes of the formula (IIa to IIf) are present in the dye composition according to the invention in a ratio of 90:10 to 10:90, preferably 60:40 to 10:90, in particular 40:60 to 15:85, parts by weight and are used in this ratio for dyeing.

Preferred dye compositions according to the invention are those containing dyes of the formulae (I) and (II) in which
Z ' is a vinylsulfonyl or a β-sulfatoethylsulfonyl group;
Z'' is a vinylsulfonyl, β-sulfatoethylsulfonyl, sulfo or sulfamide group of the formula (III) in which $R^6$ is a hydrogen atom and $R^7$ is a hydrogen atom, a phenyl or naphthyl group, preferably a hydrogen atom;
$R^1$ is a hydrogen atom or a methyl group;
$R^2$ is a hydrogen atom, a methyl or methoxy group, a chlorine or bromine atom, preferably a hydrogen atom;
$R^3$ is a hydrogen atom, a sulfo or a carboxyl group, a methyl or methoxy group, a chlorine or bromine atom, preferably a hydrogen atom;
$R^4$ is a group of the general formula (IV) in which Z''' is a vinylsulfonyl, β-sulfatoethylsulfonyl or a β-chloroethylsulfonyl group and n' is the number zero or 1
or is a group of the formula (V) in which Z' is a vinylsulfonyl, β-sulfatoethylsulfonyl or a β-chloroethylsulfonyl group and n is the number 2 or 3;
M is a hydrogen atom or an alkali metal atom, preferably sodium, potassium or lithium,
$n_1$ and $n_4$ are each the same number from 1 to 3;
$n_2$ and $n_3$ are each the same number from 1 to 3;
A is a carboxyl or sulfo group;
B is a bridging member from the group comprising $-NH-C(=O)-$ or $-C(=O)-NH-$;
D is a methoxy group or a group of the formula (VII) in which $R^6$ is a hydrogen atom and $R^8$ is a chlorine atom or a sulfo, vinylsulfonyl or β-sulfatoethylsulfonyl group; and
X is a chlorine or fluorine atom.
Particular preference is given to dye compositions containing those dyes of the formulae (II) in which
$R^2$ and $R^3$ are each a hydrogen atom;
$R^4$ is a group of the general formula (IV) in which Z''' is a vinylsulfonyl or a β-chloroethylsulfonyl group and
D is a methoxy group or a group of the formula (VII) in which $R^8$ is, each time in the meta position, a chlorine atom, a vinylsulfonyl or a β-sulfatoethylsulfonyl group.

Particular preference is furthermore given to dye compositions containing those dyes of the formula (I) in which $R^1$ is a hydrogen atom.

Preference is furthermore given to dye compositions which comprise only one dye each of dye components (I) and (II).

The following dye compositions according to the invention are particularly suitable for the purposes of the present invention:

a) a composition comprising one dye of the formula (XIX) and one dye of the formula (VIII)

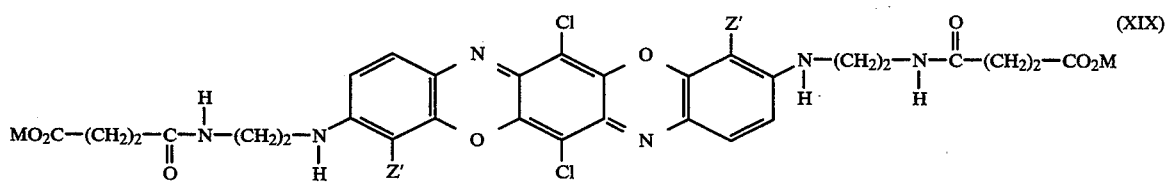

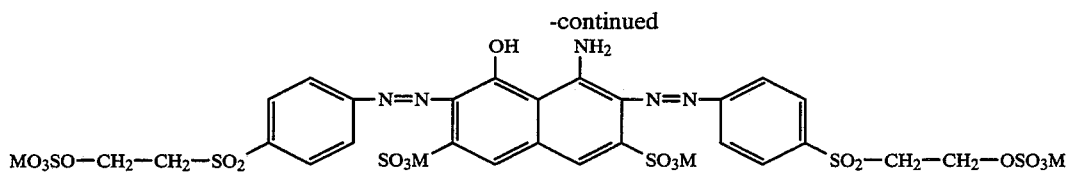

(VIII)

in which

M is hydrogen or an alkali metal atom, preferably lithium, sodium or potassium, and Z' is a vinylsulfonyl or β-sulfatoethylsulfonyl group;

b) a composition comprising one dye of the formula (XIX) and one dye of the formula (IX)

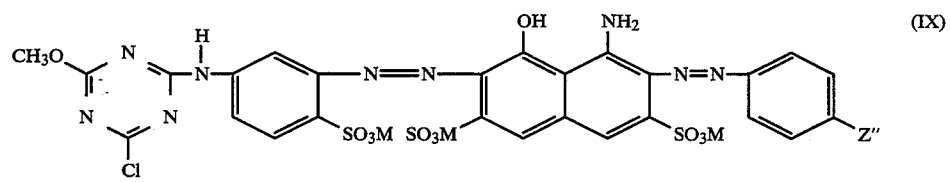

(IX)

in which M has the meanings given under a) and Z" is a vinylsulfonyl or a β-sulfatoethylsulfonyl group;

c) a composition comprising one dye of the formula (XIX) and one dye of the formula (X)

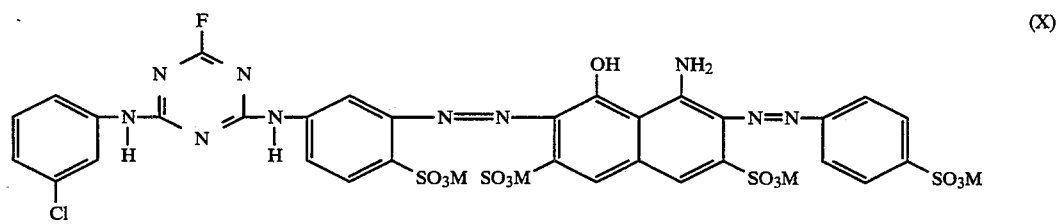

(X)

in which M has the meanings given under a);

d) a composition comprising one dye of the abovementioned and defined formula (XIX) and one dye of the formula (XI)

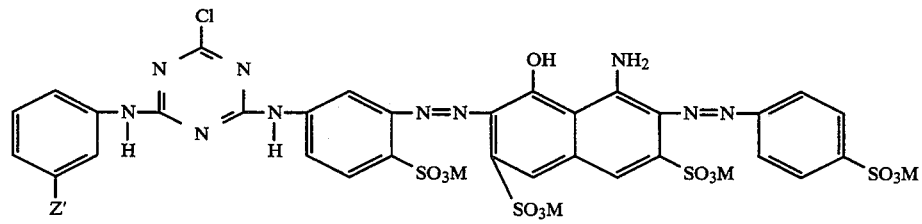

(XI)

in which M has the meanings given under b) and Z' is a vinylsulfonyl or a β-sulfatoethylsulfonyl group;

e) a composition comprising one dye of the abovementioned and defined formula (XIX) and one dye of the formula (XII)

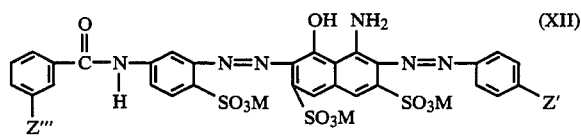

(XII)

in which M and Z' have the meanings given under d) and Z''' is a vinylsulfonyl group or a group which can form a vinylsulfonyl group under the customary alkaline dyeing conditions, such as in particular a β-sulfatoethylsulfonyl or β-chloroethylsulfonyl group;

f) a composition comprising one dye of the abovementioned and defined formula (XIX) and one dye of the formula (XIII)

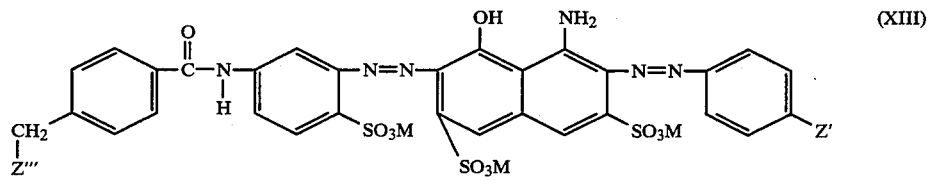

(XIII)

in which M, Z' and Z''' have the meanings given under e );

g) a composition comprising one dye of the abovementioned and defined formula (XIX) and one dye of the formula (XIV)

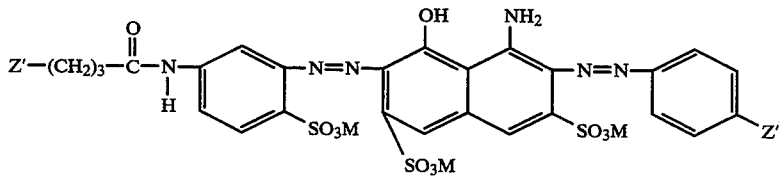
(XIV)

in which M has the meanings given under a) and Z' the meanings given under d ) or Z' is β-chloroethylsulfonyl;

h) a composition comprising one dye of the above-mentioned and defined formula (XIX) and one dye of the formula (XV)

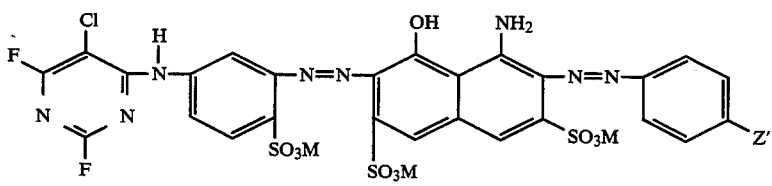
(XV)

in which M and Z' have the meanings given under d);

i) a composition comprising one dye of the above-mentioned and defined formula (XIX) and one dye of the formula (XVI)

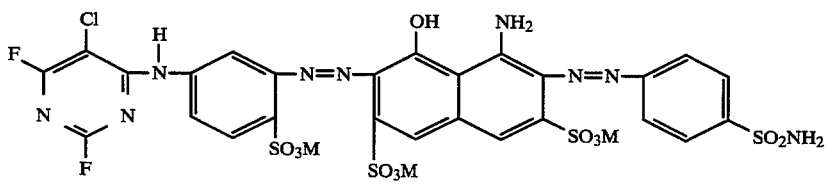
(XVI)

in which M has the meaning given under a);

j) a composition comprising one dye of the above-mentioned and defined formula (XIX) and one dye of the formula (XVII)

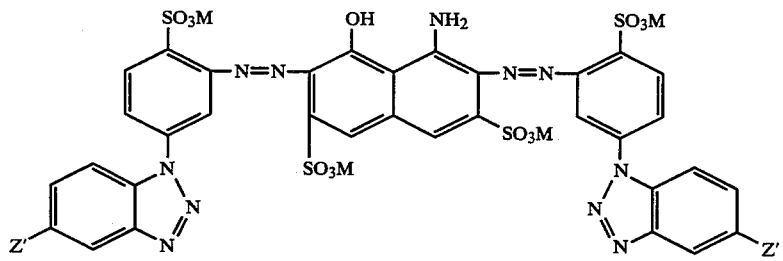
(XVII)

in which M and Z' have the meanings given under d);

k) a composition comprising one dye of the above-mentioned and defined formula (XIX) and one dye of the formula (XVIII)

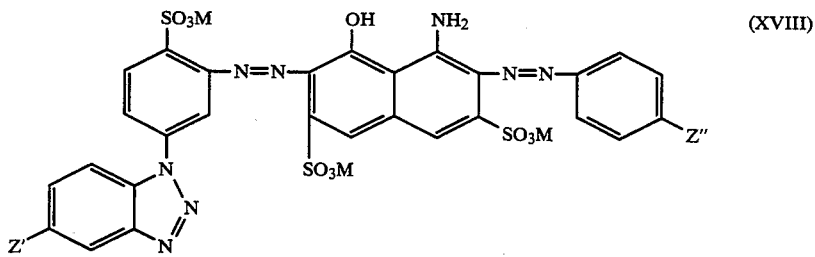
(XVIII)

in which M and Z" have the meanings given under b) and Z' has the meaning given under d).

The individual dyes of the formulae (I) and (II) are known or analogous in their chemical structure to known dyes, so that the dyes not yet described per se can be prepared analogously to the dyes described per se.

Dyes of the formula (I) are disclosed in U.S. Pat. No. 4,629,788 and U.S. Pat. No. 4,774,333; the dyes of the formula (IIa) are described in U.S. Pat. No. 4,492,654 in British Patent No. 1,183,661 and in U.S. Pat. No. 2,657,205 (columns 9/10), the dyes of the formula (IIb) are described in U.S. Pat. No. 4,412,948 and in GB-A-2,029,850, the dyes of the formula (IIc) are described in U.S. Pat. No. 4,818,814, the dyes of the formula (IId) are described in U.S. Pat. Nos. 3,669,951, 4,052,386, 3,822,263, 3,910,758 and 4,007,164 and in U.S. Pat. No. 4,500,321 and the dyes of the formulae (IIe) and (IIf) are described in U.S. Pat. No. 4,946,947.

The dye compositions according to the invention can be present in solid or pulverulent form or in the form of granules having a total dye content of dyes (I) and (II) of 20 to 80% by weight, preferably 40 to 60% by weight. As a rule, the dye compositions contain the usual electrolyte salts, such as sodium chloride, potassium chloride and sodium sulfate. Furthermore, the dye compositions can contain buffer substances, for example alkali metal acetate, sodium hydrogen phosphate, disodium hydrogen phosphate and sodium borate. Furthermore, the dye compositions can contain other substances customary for dye preparations, such as granulating aids, additives for dustproofing, solubility-improving additives, siccatives, fungicides and dyeing assistants.

The dye compositions according to the invention can also be present in the form of a liquid solution, in particular as aqueous solution having a total dye content of dyes (I) and (II) of at least 10% by weight, preferably between 10 and 50% by weight. The solution can also contain the additives mentioned customary for solid preparations and dispersing auxiliaries. The liquid solution preferably has a pH of between 4 and 7.

The dye compositions according to the invention preferably contain only one dye of the formula (I) and only one dye of the formula ( II ). However, dye compositions containing a plurality of dyes of the formula (I) in any desired weight ratios with respect to one another are also suitable for the application according to the invention. Dye compositions containing a plurality of dyes of the formula (II) in any desired weight ratios with respect to one another are also suitable.

The dye compositions according to the invention of the formulae (I) and (II) can additionally contain fiber-reactive dyes of different constitution and shade in any desired mixing ratios, enabling blended shades to be obtained on the fiber material in the usual manner.

Examples of carboxamido-containing materials on which level dyeings having good fastness properties can be produced using the dye compositions according to the invention are synthetic polyamide fiber materials and wool. However, level dyeings having good fastness properties are preferably and advantageously produced on hydroxyl-containing fiber materials, in particular cellulose fiber materials, such as cotton, regenerated cellulose and bast fibers.

The dye compositions according to the invention can be prepared in the usual manner, for example by mixing the individual solid dye components of the formulae (I) and (II) which are obtainable from the synthesis solution by salting-out, spray-drying or granulation or by mixing the corresponding synthesis solutions of the individual dye components, followed by joint isolation as dye solution, dye powder or by salting-out or spray-drying or as granulates. During this, the customary abovementioned additives can be added to the solutions before isolating the dye or to the solid individual components or mixtures thereof. The dye compositions according to the invention can be applied by the customary application and fixation methods.

The dye compositions according to the invention are distinguished by very good water solubility and have a high affinity for the substrate to be dyed, making it possible to obtain dyeings and prints of high color depths in high yields. Despite their high affinity for the fiber, the dye mixtures according to the invention produce highly level dyeings, since the two dye components of the formulae (I) and (II) are fixed on the substrate in a surprisingly homogeneous manner.

The dye compositions according to the invention can also contain auxiliaries for dyeing or printing, such as those customary for the application of reactive dyes. Examples of auxiliaries are water or hydrotropic agents, such as glycerol, glycol ether or polyglycol ether or urea, oxidizing agents against the reductive effect of cellulose, such as 2,4-dinitrobenzenesulfonic acid or 3-nitrobenzenesulfonic acid, salts for increasing the fixation yield, such as sodium chloride or sodium sulfate, or wetting agents, organic solvents or fixing agents, such as sodium hydroxide solution, sodium carbonate, sodium bicarbonate, waterglass and trisodium phosphate.

This coloristic behavior of the dye compositions according to the invention proves particularly advantageous when dyeing by the exhaust method from an aqueous bath, in which the dyeing is preferably carried out at a liquor ratio of 5:1 to 50:1 and a dyeing temperature of 30 to 80° C. The exhaust method is carried out in an alkaline medium using a wide range of alkaline additives, such as those customary for the dyeing of cellulose fibers using reactive dyes of the vinylsulfonyl type, for example sodium hydroxide solution, sodium carbonate or sodium bicarbonate and further dyeing assistants, such as sodium chloride or sodium sulfate.

The dye compositions according to the invention make it possible to dye at the particular dyeing temperature over a period of up to six times the recommended and optimum dyeing time without any significant change in the color strength and hue of the dyed fibers.

The dye compositions according to the invention can be used for dyeing or printing as such in solid form, i.e. individually or as a solid mixture, or in liquid dissolved form, i.e. as a solution of the individual dyes or as a mixture of these solutions. However, it is also possible to use or incorporate the dye components of the formulae (I) and (II) in the mixing range given separately in the dye bath, in the dye liquor or in the printing paste.

Instead of the direct application of solid powders of the individual dyes used according to the invention or solid mixtures thereof, the dyes used according to the invention can also be used beforehand in a stable aqueous solution. An aqueous stable solution of the dye mixtures according to the invention is obtained, for example, by dissolving the corresponding amounts of the dye of the formula (I) and of the dye of the formula (II) or a mixture thereof in water with the addition of a buffer which is capable of adjusting the pH of the solution to a value of between 3 and 7 and maintaining it at that value.

Accordingly, the invention relates not only to the use of dye mixtures of the formulae (I) and (II) in the mixing ratios given but also to the simultaneous use of dyes of the formulae (I) and (II) in the mixing ratios given for the dyeing, including printing, of carboxamido-containing or, preferably hydroxyl-containing fiber materials by the dyeing or printing processes customary for fiber-reactive dyes.

The examples which follow serve to illustrate the invention. Parts and percentages are by weight unless stated otherwise. Parts by weight relate to parts by volume as the kilogram relates to the liter. The formulae occurring in the examples are given in the form of the free acid, but the dyes in question are usually used in the form of the alkali metal salts.

EXAMPLE 1

50 parts of a bleached knitted cotton fabric were introduced at a temperature of 20° C. to 25° C. into a solution of 0.13 part of the dye of the formula (A), 0.45 parts of the dye of the formula (B) and 50 parts of sodium sulfate decahydrate in 1000 parts of water.

| Example | Parts of dye (A): Parts of dye (B): | Dyeing time in hours | Relative color strength in reflected light in % |
| --- | --- | --- | --- |
| 1e | 0.5:0 | 1.5 | 98 |
| 1f | 0.5:0 | 2.0 | 94 |
| 1g | 0.5:0 | 3.0 | 90 |
| 1h | 0.5:0 | 4.0 | 85 |
| 1i | 0.13:0.45 | 0.5 | 100 |
| 1j | 0.13:0.45 | 1.0 | 100 |

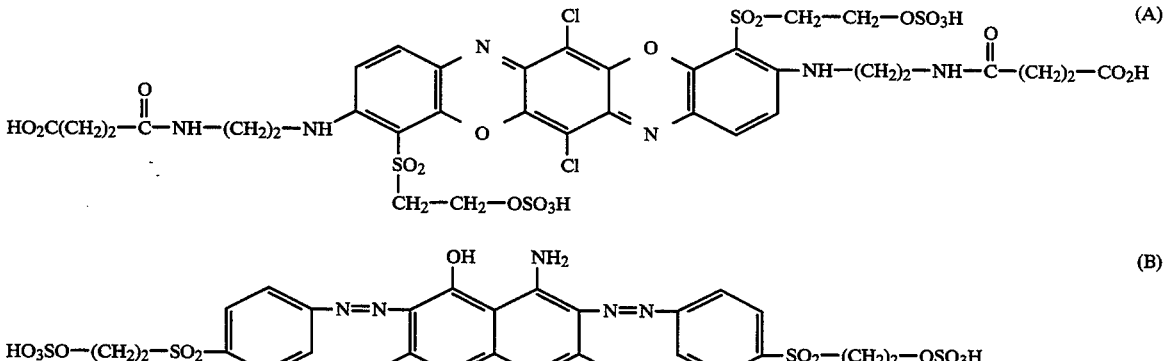

5 parts of anhydrous sodium carbonate and 0.5 part of an aqueous 32% sodium hydroxide solution were then added. The dye bath was heated to 60° C. over a period of 30 minutes with thorough agitation of the cotton material, and the dyeing was continued at this temperature for 60 minutes. The dyed material was then finished in the usual manner, i.e. by rinsing with cold and hot water, by neutralization in an aqueous bath containing dilute acetic acid and then by boiling in an aqueous washing solution containing a nonionic detergent, by rinsing again with hot and cold water, followed by drying.

This gave a level and vivid navy dyeing of high color depth and good light and wet light fastness properties.

Comparative Example 1a

The procedure of Example 1 was repeated, except that 0.5 part of the dye (A) was used as the only dye, giving a clear blue dyeing of poor levelness.

Comparative Example 1b

The procedure of Example 1 was repeated, except that 0.5 part of the dye (B) was used as the only dye, giving a dyeing having a dull navy shade and poor light and wet light fastness properties.

Comparative Examples 1c to 1h and Examples 1i to 1n (longer dyeing time):

The procedure of Example 1 was repeated, except that the dyeing time at 60° C. was longer in accordance with the table below. The dyeing of dye (A) lost some of its color strength (Comparative Examples 1c to 1h), while the color strength of the dyeing obtained with the mixture of dye A and B (Examples 1i to 1n) did not change significantly.

| Example | Parts of dye (A): Parts of dye (B): | Dyeing time in hours | Relative color strength in reflected light in % |
| --- | --- | --- | --- |
| 1c | 0.5:0 | 0.5 | 99 |
| 1d | 0.5:0 | 1.0 | 100 |
| 1k | 0.13:0.45 | 1.5 | 100 |
| 1l | 0.13:0.45 | 2.0 | 99 |
| 1m | 0.13:0.45 | 3.0 | 99 |
| 1n | 0.13:0.45 | 4.0 | 98 |

EXAMPLE 2

100 parts of a mercerized cotton fabric were introduced at a temperature of 20° C. to 25° C. into a solution of 0.6 part of dye (A), 1.2 parts of dye (B) and 50 parts of sodium sulfate decahydrate in 1000 parts of water. 5 parts of anhydrous sodium carbonate and 2 parts of an aqueous 32% sodium hydroxide solution were then added. The dye bath was heated to 40° C. over a period of 15 minutes with thorough agitation of the cotton material, and the dyeing was continued at this temperature for 90 minutes. The dyed material obtained was then finished in the usual manner, for example according to Example 1. This likewise gave a level navy dyeing of high color strength and the same fastness properties as those mentioned in Example 1. Increasing the dyeing time to 6 hours did not change the color strength and hue significantly, whereas a control dyeing using only 1 part of dye (A) showed a loss in color strength of about 15% after 6 hours (color strength after 90 minutes=100%). EXAMPLE 3

The procedure of Example 1 was repeated, except that 200 parts of a blended fabric comprising 67 parts of polyester fibers and 33 parts of cotton were used instead of the material to be dyed. This gave a dyeing having a level navy shade of the cotton portion which also has the good fastness properties mentioned in Example 1.

The polyester fiber portion was dyed separately or cross dyed in the usual manner with a suitable disperse dye before or after fixation of the fiber-reactive dye compositions according to the invention; in this manner, a level solid dyeing of the entire fabric in navy shades of high color strength was obtained.

Increasing the dyeing time to 4 hours did not change the color strength and hue significantly, whereas a control dyeing using 0.6 part of dye (A) as the only dye showed a loss in color strength of about 15% after 4 hours (color strength after 1 hour=100%).

EXAMPLES 4 to 8

In each case, the procedure of Example 1 was repeated, except that the two dyes (A) and (B) were used in different mixing ratios as indicated in the table below. In this manner, likewise level dyeings having the good fastness properties mentioned and not having stripes or spots were obtained in the navy shade given for the particular table example.

| Example | Parts of dye (A) | Parts of dye (B) | Navy shade |
| --- | --- | --- | --- |
| 4 | 0.2 | 1.6 | reddish |
| 5 | 0.5 | 1.3 | neutral |
| 6 | 0.8 | 1.0 | greenish |
| 7 | 1.1 | 0.7 | greenish |
| 8 | 1.4 | 0.4 | greenish |

EXAMPLE 9

A mercerized cotton fabric was padded with a dye liquor at a temperature of about 20° C. and a liquor pickup of 70%. The latter was prepared by mixing 4 parts of a solution containing per liter, in addition to water, 6 parts of the dye of the formula (A), 8 parts of the dye of the formula (B), 100 parts of urea and 3 parts of a commercially available wetting agent with 1 part of a solution prepared from 23 parts of an aqueous 32% sodium hydroxide solution and 95 parts of an aqueous waterglass whose content corresponded to 38° Bé and whose $Na_2O:SiO_2$ ratio was 1:3.3. The padded fabric was immediately wrapped up airtight in plastic sheeting and left at 20° C. for 15 hours. The dyed material was then finished in the usual manner, for example according to Example 1. This gave a strong navy dyeing having good levelness and good light and wet light fastness properties.

EXAMPLE 10

An aqueous printing paste was prepared which contained, per 2 g, in addition to water, 10 parts of the dye of the formula (A), 8 parts of the dye of the formula (C), 450 parts of an aqueous 8 % sodium alginate thickener solution, 3 parts of sodium dihydrogen phosphate and 10 parts of the sodium salt of 2,4-dinitrobenzenesulfonic acid.

This printing paste was used to print a mercerized cotton fabric by the screen-printing method. The printed fabric was then steamed at 110° C. for 25 seconds and then over-padded with a solution containing, per liter, in addition to water, 100 parts of sodium chloride, 100 parts of anhydrous sodium carbonate, 100 parts of anhydrous potassium carbonate and 80 parts of an aqueous 32% sodium hydroxide solution at a liquor pickup of 70%, then steamed again at 110° C. for 8 seconds and then finished by rinsing with cold and hot water, by boiling in a washing solution containing a nonionic detergent, by rinsing it again in hot and cold water, followed by drying.

This gave a navy print of high color strength, high levelness and good light and wet light fastness properties.

EXAMPLE 11

3.5 parts o f dye (A) and 6.5 parts of dye (B) were dissolved in 100 parts of water, and the pH was then brought to a value of about 5 using a sodium hydrogen phosphate/disodium hydrogen phosphate buffer. This stable liquid formulation of the dye composition according to the invention could be used for the dyeing of cellulose fiber materials, such as cotton, by one of the dyeing methods given in the above examples even after a storage time of several weeks without loss in coloristic properties.

EXAMPLES 12 to 21

The table below describes further examples of the dye compositions according to the invention, which were used for the dyeing of cellulose fiber materials, for example using one of the dyeing methods described in the above exemplary embodiments. Likewise, dyeings of high color strength, good levelness and good light and wetlight-fastness properties were obtained.

| | Dye of the formula (II): | | Mixing ratio of dye (XIX) to dye (II) |
| --- | --- | --- | --- |
| Example | Formula | Definition of the reactive substituents Z', Z" or Z''' | |
| 12 | (IX) | Z' = β-sulfatoethyl-sulfonyl | 1:3.0 |
| 13 | (X) | as indicated | 1:1.1 |
| 14 | (XI) | Z' = vinylsulfonyl | 1:1.2 |
| 15 | (XII) | Z' = β-sulfatoethyl-sulfonyl Z''' = β-chloroethyl-sulfonyl | 1:2.8 |
| 16 | (XIII) | Z' = β-sulfatoethyl-sulfonyl Z''' = β-chloroethyl-sulfonyl | 1:4.0 |
| 17 | (XIV) | Z' = vinylsulfonyl | 1:0.8 |
| 18 | (XV) | Z' = β-sulfatoethyl-sulfonyl | 1:5.0 |
| 19 | (XVI) | as indicated | 1:1.5 |
| 20 | (XVII) | Z' = β-sulfatoethyl-sulfonyl | 1:2.3 |
| 21 | (XVIII) | Z' = Z" = β-sulfato-ethylsulfonyl | 1:1.0 |

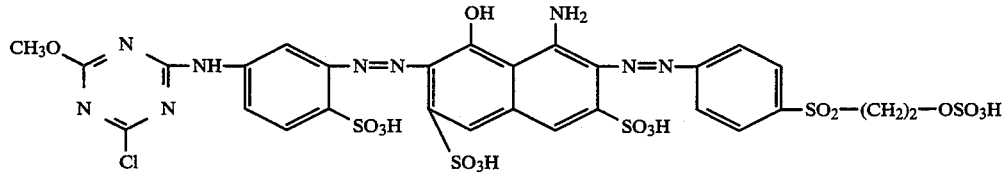

(C)

In all the examples listed, the increase in the dyeing time to 4 hours does not significantly affect the dyeing result, i.e. color strength and shade of the dyeing, if a dye composition according to the invention is used for dyeing.

We claim:

1. A dye composition of water-soluble fiber-reactive dyes, wherein the dye composition contains at least one dioxazine dye of the formula (I) and at least one disazo dye of the formulae (IIa), (IIb), (IIc), (IId), (IIe) and (IIf) in a formula I:formulae II weight ratio of 90:10 to 10:90 parts by weight,

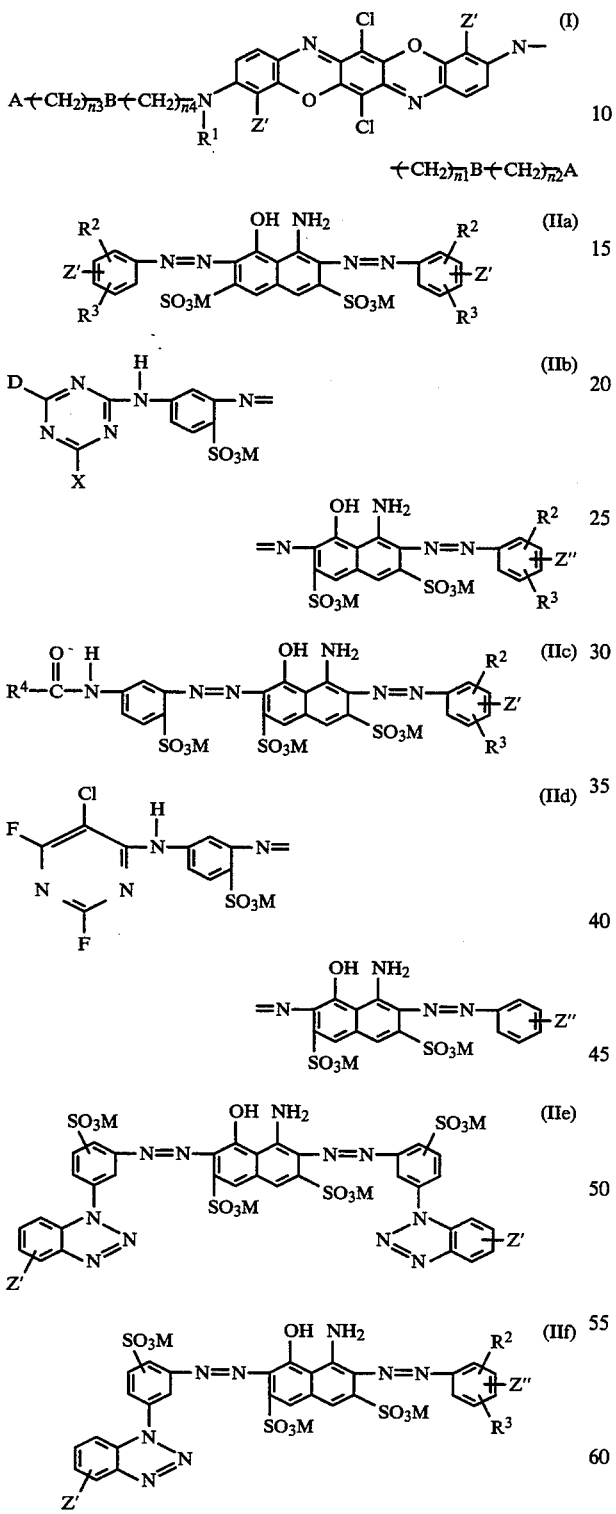

in which the individual symbols have meanings which are identical to or different from one another and Z' is a vinylsulfonyl group, a β-sulfatoethylsulfonyl group or an ethylsulfonyl group which is substituted in the β position by a substituent which can be eliminated by alkali with the formation of a vinylsulfonyl group;

Z" has the same meaning as Z' or is a carboxyl, sulfo or sulfonamide group of the formula (III)

in which $R^6$ is a hydrogen atom, a $C_1$-$C_4$-alkyl group or a $C_1$-$C_4$-alkyl group which is substituted by a sulfo, sulfato, phosphato or carboxyl group, and $R^7$ is a hydrogen atom or a $C_1$-$C_4$-alkyl group which can be substituted by 1 or 2 substituents from the group consisting of sulfato, sulfo, carboxyl and phosphato, or is an aryl group, which can be substituted by 1 to 3 substituents from the group consisting of sulfo and carboxyl, or is a $C_1$-$C_4$-alkyl group which is substituted by an aryl group and can be substituted in the aryl moiety by 1 to 3 substituents from the group consisting of sulfo and carboxyl;

$R^1$ is a hydrogen atom, a $C_1$-$C_4$-alkyl group or a $C_1$-$C_4$-alkyl group which is substituted by a sulfo, sulfato, phosphato or carboxyl group;

$R^2$ and $R^3$, independently of one another, are each a hydrogen atom, a sulfo group, a carboxyl group, a $C_1$-$C_4$-alkyl group, an alkoxy group having 1 to 4 carbon atoms or a halogen atom;

$R^4$ is a group of the formula (IV)

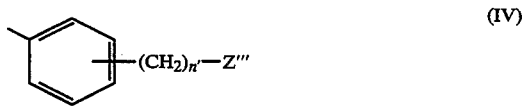

in which

Z''' has the same meaning as Z', and n' is an integer from 0 to 3, or is a group of the formula (V)

 (V)

in which

Z' has the abovementioned meaning and n is an integer from 1 to 3;

M is a hydrogen atom or an alkali metal atom;

$n_1$, $n_2$, $n_3$ and $n_4$ are each, independently of one another, an integer from 1 to 3;

A is a sulfo, sulfato, phosphato or carboxyl group;

B is a bridging member from the group consisting of —O—, —S—, —SO$_2$—, —C(=O)—, —NH—, —NH—C(=O)— and —C(=O)—NH—;

D is a hydroxyl, sulfo, cyanamide or alkoxy group having 1 to 4 carbon atoms, a halogen atom, or a group of the formula (VI)

 (VI)

in which $R^6$ and $R^7$ have the abovementioned meanings, or is a group of the formula (VII)

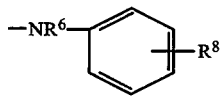

in which

R⁶ has the abovementioned meanings

R⁸ is a halogen atom, a sulfo group or a sulfonamide group of the formula (III) defined above or a carboxyl group, a β-sulfatoethylsulfonyl group, a vinylsulfonyl group or an ethylsulfonyl group which is substituted in the β position by a substituent which can be eliminated by alkali with the formation of a vinylsulfonyl groups, and X is a halogen atom.

2. A dye composition as claimed in claim 1, which contains a dye of formula (I) and a dye of formulae (II) in a formula (I):formulae (II) weight ratio of between 60:40 and 10:90 parts by weight.

3. A dye composition as claimed in claim 1, which contains a dye of formula (I) and a dye of formulae (II) in a formula (I):formulae (II) weight ratio of between 40:60 and 15:85 parts by weight.

4. A dye composition as claimed in claim 1, wherein in the dyes of formula (I) and formulae (II)

Z' is a vinylsulfonyl or a β-sulfatoethylsulfonyl group;

Z" is a vinylsulfonyl, β-sulfatoethylsulfonyl, sulfo or sulfamide group of the formula (III) in which R⁶ is a hydrogen atom and R⁷ is a hydrogen atom, a phenyl or naphthyl group;

R¹ is a hydrogen atom or a methyl group;

R² is a hydrogen atom, a methyl or methoxy group, a chlorine or bromine atom;

R³ is a hydrogen atom, a sulfo or a carboxyl group, a methyl or methoxy group, a chlorine or bromine atom;

R⁴ is a group of the general formula (IV) in which Z''' is a vinylsulfonyl, β-sulfatoethylsulfonyl or a β-chloroethylsulfonyl group and n' is the number zero or 1 or is a group of the formula (V) in which Z' is a vinylsulfonyl, β-sulfatoethylsulfonyl or a β-chloroethylsulfonyl group and n is the number 2 or 3;

M is a hydrogen atom or an alkali metal atom, n₁ and n₄ are each the same number from 1 to 3;

n₂ and n₃ are each the same number from 1 to 3;

A is a carboxyl or sulfo group;

B is a bridging member from the group comprising —NH—C(=O)— or —C(=O)—NH—;

D is a methoxy group or a group of the formula (VII) in which R⁶ is a hydrogen atom and R⁸ is a chlorine atom or a sulfo, vinylsulfonyl or β-sulfatoethylsulfonyl group; and X is a chlorine or fluorine atom.

5. A dye composition as claimed in claim 4, wherein in the dyes of formula (I) and formulae (II)

R⁷, R² and R³ are each a hydrogen atom and

M is sodium, potassium or lithium.

6. A dye composition as claimed in claim 1, wherein in the dye of formula (I) Z' is a β-sulfatoethylsulfonyl group.

7. A dye composition as claimed in claim 1, wherein in the dyes of formula (I) R¹ is a hydrogen atom.

8. A dye composition as claimed in claim 1, wherein in the dyes of formulae (II)

R² and R³ are each a hydrogen atom;

R⁴ is a group of the formula (IV) in which Z''' is a vinylsulfonyl or a β-chloroethylsulfonyl group and D is a methoxy group or a group of the formula (VII) in which R⁸ is, each time in the meta position, a chlorine atom, a vinylsulfonyl or a β-sulfatoethylsulfonyl group.

9. A dye composition as claimed in claim 1, wherein in the dyes of the formulae (II) Z', Z" and Z''' are each a β-sulfatoethylsulfonyl group.

10. A dye composition as claimed in claim 1, consisting essentially of one dye each of the formula (I) and formulae (II).

11. A dye composition as claimed in claim 1, consisting essentially of one dye of the formula (XIX) and one dye of the formula (VIII)

in which

M is hydrogen or an alkali metal atom and

Z' is a vinylsulfonyl or β-sulfatethylsulfonyl group.

12. A solution of a dye composition as claimed in claim 1, having an overall dye content of dyes of formula (I) and formulae (II) of 10 to 50% by weight and a pH of between 4 and 7.

13. A aqueous solution of a dye composition as claimed in claim 1 having an overall dye content of dyes of formula (I) and formulae (II) of 10 to 50% by weight and a pH of between 4 and 7.

14. A powder or granules of a dye composition as claimed in claim 1 having an overall dye content of dyes of formula (I) and of formulae (II) of 20 to 80% by weight.

15. A powder or granules of a dye composition as claimed in claim 1 having an overall dye content of dyes of formula (I) and formulae (II) of 40 to 60% by weight.

16. Method of dyeing or printing a carboxamido-containing fiber material with a dye composition as claimed in claim 1.

17. Method of dyeing or printing a hydroxyl-containing fiber material with a dye composition as claimed in claim 1.

18. Method of dyeing cellulose fiber materials under alkaline dyeing conditions as claimed in claim 17 by the exhaust method.

* * * * *

UNITED STATES PATENT AND TRADEMARK OFFICE
CERTIFICATE OF CORRECTION

PATENT NO. : 5,352,246
DATED : October 4, 1994
INVENTOR(S) : Manfred Hahnke, et al.

It is certified that error appears in the above-indentified patent and that said Letters Patent is hereby corrected as shown below:

In claim 11 (column 20, line 30 of issued patent) formulas XIX and VIII were not printed. The following formulas should be inserted directly after line 30:

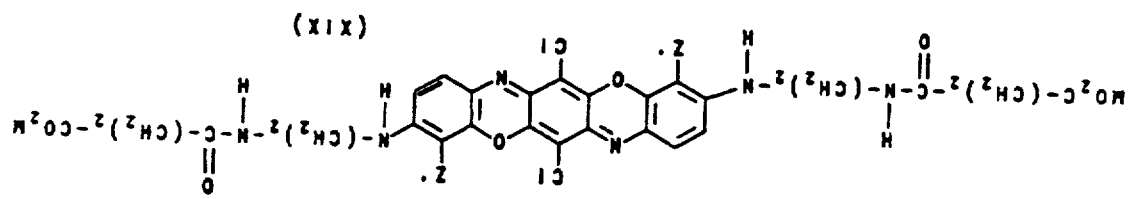

UNITED STATES PATENT AND TRADEMARK OFFICE
CERTIFICATE OF CORRECTION

PATENT NO. : 5,352,246
DATED : October 4, 1994
INVENTOR(S) : Manfred Hahnke, et al.

Page 2 of 2

It is certified that error appears in the above-indentified patent and that said Letters Patent is hereby corrected as shown below:

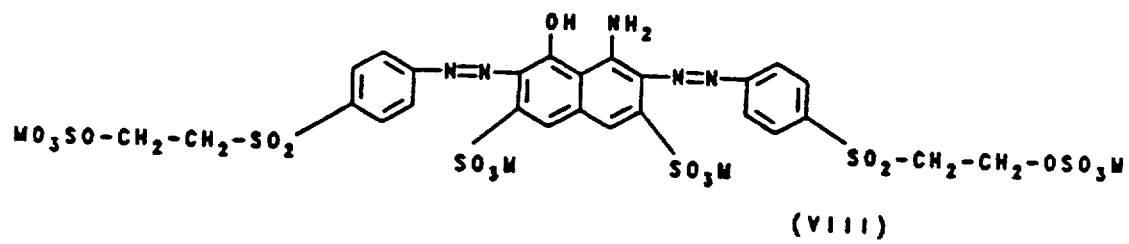

(VIII)

Signed and Sealed this

Thirtieth Day of May, 1995

Attest:

BRUCE LEHMAN

Attesting Officer

Commissioner of Patents and Trademarks